United States Patent Office 3,558,435
Patented Jan. 26, 1971

3,558,435
DIAGNOSTIC AGENTS FOR USE IN THE DETERMINATION OF HYDROPEROXIDES AND OF PEROXIDATE-ACTIVE SUBSTANCES AND METHODS FOR MANUFACTURING AND USING THE SAME
Hans-Georg Rey, Mannheim-Waldhof, Hans Wielinger, Mannheim, and Peter Rieckmann, Mannheim-Waldhof, Germany, assignors to Boehringer Mannheim Gesellschaft mit beschrankter Haftung, Mannheim-Waldhof, Germany, a corporation of Germany
No Drawing. Filed Aug. 4, 1967, Ser. No. 658,329
Claims priority, application Germany, Sept. 1, 1966, B 88,720
Int. Cl. G01n 31/14, 31/22
U.S. Cl. 195—103.5
21 Claims

ABSTRACT OF THE DISCLOSURE

There are disclosed diagnostic agents suitable for use in carrying out rapid analytical determinations of the presence and/or concentration of hydroperoxide, substances which react with the liberation of hydrogen peroxide, peroxidase and peroxidate-active substances. The diagnostic agents of the invention are adapted for use in test procedures involving optical instruments such as colormeters and photometers and also in test procedures involving test papers.

The diagnostic agents as taught herein comprise an indicator i.e., chromogen, which is oxidized by hydrogen peroxide and peroxidase or peroxidate active substances to form a dyestuff whose intensity is dependent on the concentration of the peroxide, peroxidase or peroxidate active substance present in the test sample. The indicator i.e., chromogen is a compound of the formula:

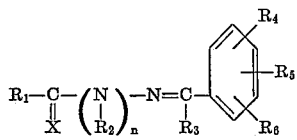

wherein $R_1$ is amino or an aliphatic, araliphatic, aromatic or heterocyclic radical which may carry one or more substituents, or a group having the formula:

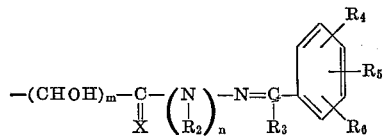

wherein $R_2$ is hydrogen, an aliphatic, aromatic or heterocyclic radical which may carry one or more substituents, $R_3$ is hydrogen, alkyl or phenyl and may be mono- or poly substituted, $R_4$ is amino, hydroxy or alkoxy, $R_5$ and $R_6$ are each hydrogen, amino, hydroxy, alkoxy or alkyl, X is oxygen, sulfur or imino which may be substituted by a group as defined by $R_1$, $n$ is 0 or 1, $m$ is 0, 1 or 2; and wherein X and $R_1$ and $R_2$ or $R_1$ and $R_3$ can be joined together to form a ring.

The diagnostic agents can be used for analytical determinations involving, for example, glucose, galactose, amino acids, uric acid, peroxide, hemoglobin, peroxidase, etc. in samples, for example, constituting biological fluids such as blood, urine, spinal fluid, etc., milk, cosmetic and drug formulations, etc.

This invention relates to diagnostic agents for use in carrying out rapid analytical determinations and to methods for manufacturing and using the same. More particularly, this invention relates to diagnostic agents for use in the analytical determination of hydroperoxide and of substances from which hydrogen peroixde can be liberated by a previous reaction, as well as of peroxidase and other peroxidate-active substances.

The detection of glucose in urine, blood and serum has, in the case of diabetes, acquired great importance as has also the detection of peroxidateactive substances, such as haemoglobin in urine and blood, and the detection of hydroperoxides in, for example, the milk industry, the cosmetics industry and in polymer chemistry.

A series of compounds are known which are oxidized to form dyestuffs by means of hydrogen peroxide and peroxidase as catalyst. Compounds of this type include, for example, benzidine, o-dianisidine, o-tolidine and guaiacol. However, it has been established that some of these compounds are not very stable and further according to very recent findings, that they can also be dangerous to the health of personnel so that their use does not appear to be free of danger.

In accordance with the invention, it has now surprisingly been found that compounds having the following Formula I have excellent indicator properties and unlimited stability and are very well suited for use in the analytical determination of hydrogen peroxide, peroxidases and peroxidate active substances, effected by means of both colorimetry and with test papers. The compounds of Formula I have been found to be physiologically harmless and entirely reliable and are characterized by the following formula:

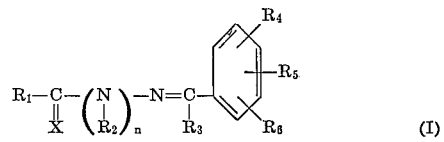
(I)

wherein $R_1$ is amino, an unsubstituted, mono- or polysubstituted aliphatic, araliphatic, aromatic or heterocyclic radical, or a group having the formula:

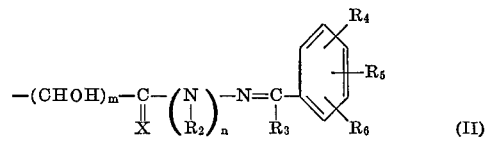
(II)

wherein $R_2$ is hydrogen or an unsubstituted, mono- or polysubstituted aliphatic, aromatic or heterocyclic radical, $R_3$ is hydrogen, alkyl or a phenyl radical, which may be mono- or polysubstituted, $R_4$ is amino, hydroxy or alkoxy, $R_5$ and $R_6$, which may be the same or different, are each hydorgen, amino, hydroxy, alkoxy or alkyl, X is oxygen, sulfur or imino which may be substituted by an $R_1$ group, $n$ is 0 or 1 and $m$ is 0, 1 or 2; and wherein X and $R_1$ or $R_1$ and $R_2$ or $R_1$ and $R_3$ can be joined together to form a ring which may be substituted.

According to the present invention, there is also provided a process for the determination of hydroperoxides and of substances which react with the liberation of hydrogen peroxide, as well as of peroxidase and of peroxidate-active substances, which is based on the reaction of a chromogen (Formula I) with the hydroperoxide and peroxidase or peroxidate-active substances. The reaction is a so-called color reaction, the color produced serving to both qualitatively and quantitatively indicate the presence of the particular substance.

The evaluation of the coloration can be carried out, for example, by optical measurement using for instance a spectrophotometer, or when test paper strips are involved, by comparison of the color intensity with standard color scales or standard comparison solutions.

The process according to the present invention can, of course, be used in procedures for the determination of the presence of chromogen of the Formula I using therefor a hydroperoxide and a peroxidate-active substance. This process is very useful as a control measure in the production of the diagnostic agents.

The determination of the presence of hydroperoxides by the process according to the present invention is particularly useful for coupled and uncoupled enzyme reactions, as for example, for the determination of glucose, galactose, amino acids, uric acid, peroxides, haemoglobin, peroxidase or other peroxidate-active substances, as well as of enzyme activities. Because of their outstanding importance, the routine determination of substrates of this type is now an essential feature of clinical chemistry and of foodstuff chemistry.

In the case of the determination of glucose, the latter is, for example, oxidized by glucose-oxidase to gluconic acid, atmospheric oxygen thereby being reduced to hydrogen peroxide. In the presence of peroxidase or a peroxidate-active substance, the hydrogen peroxide then oxidizes the indicator or chromogen (Formula I) used according to the present invention producing the corresponding colored material.

Further examples of analytically-useful enzyme systems of this type, which react with the liberation of hydrogen, peroxide, include L-amino acid oxidase+L-amino acid, D-amino acid oxidase+D-amino acids, unicase+uric acid, xanthine oxidase+hypoxanthine or xanthine, glycine oxidase+glycine, monoamino oxidase+monoamine (such as adrenaline, mescaline or the like), diamine oxidase+diamine (such as histamine), luciferase+luciferin, D-aspartic acid oxidase+aspartic acid, liver aldehyde oxidase+aldehyde, galactose oxidase+galacetose and Edson's flavine enzyme+lactic acid.

According to a further feature of the present invention, there is provided a diagnostic agent for the determination of hydroperoxides and of substances which react with the liberation of hydrogen peroxide, which comprises peroxidase or a peroxidate-active substance and a chromogen of the Formula I.

According to yet another feature of the present invention, there is provided a diagnostic agent for the determination of peroxidate-active substances, which comprises hydrogen peroxide or a substance forming hydrogen peroxide and a chromogen of the Formula I. A typical peroxidate-active substance is blood.

It is to be understood that the new diagnostic agents according to the present invention can be prepared in the form of solutions in appropriate solvents, if necessary, with the addition of conventional adjuvants, such as buffers. Alternatively, the new diagnostic agents can be prepared in the form of test papers by the impregnation of suitable adsorbent material, such as filter paper, using solutions of the componets of the diagnostic agents. Here again, it is frequently advantageous for the test papers to contain conventional adjuvants, such as buffers, which, however, in this case must be solid.

A more comprehensive understanding of the invention may be obtained by referring to the following illustrative examples, which are not intended, however, to be unduly limitative of the invention.

EXAMPLE 1

Determination of peroxides in liquids 7.5 mg. peroxidase were dissolved in 100 ml. of a 0.1 M citrate or phosphate buffer having a pH of 5.6 and the solution thereby obtained used for the impregnation of a filter paper (Schleicher & Schüll 2316). Following drying, the paper was again impregnated with a solution prepared from 0.31 g. o-vanillin-(o-vanilloyl)-hydrazone in 100 ml. alcohol. When the test paper thus obtained was immersed into solutions of hydrogen peroxide of various concentrations, the paper became violet colored, the intensity of the coloration depending upon the concentration of the hydrogen peroxide present in the solution.

EXAMPLE 2

Determination of glucose in urine 7.5 mg. peroxidase and 143 mg. glucose oxidase were dissolved in 100 ml. of a 0.1 M citrate or phosphate buffer having a pH of 5.6. This solution was then used for the impregnation of filter paper (Schleicher & Schüll 2316). After drying, the paper was again impregnated with a solution prepared by dissolving 0.30 g. 2,3-dihydroxybenzal-(vanilloyl)-hydrazone in 100 ml. alcohol. When the paper thus obtained was immersed into a sample of glucose-containing urine, having a concentration of glucose, of about 50 mg.–percent, there was obtained a pink coloration, the intensity of which depended upon the glucose concentration in the urine sample.

EXAMPLE 3

Determination of glucose in blood 7.5 mg. peroxidase, 143 mg. glucose oxidase and 200 mg. sodium alginate were dissolved in 100 ml. 0.4 M citrate or phosphate buffer having a pH of 5.6. The resulting solution was used for the impregnation of filter paper (Schleicher & Schüll 23 S). After drying, the paper was again impregnated with a solution which was obtained by dissolving 0.316 g. o-vanillin-(vanilloyl)-hydrazone in 100 ml. alcohol. Thereafter, the paper was impregnated with a solution, for the third time, of 3 g. paraffin in 100 ml. petroleum ether according to the procedure described in our U.S. patent application Ser. No. 535,010. When a drop of blood containing, for example, 50 mg.-percent glucose, was placed on the test paper so produced, allowed to react for one minute and the blood then washed off with water, the paper takes on a clear violet coloration, the intersity of which depends upon the concentration of the glucose in the blood.

EXAMPLE 4

Determination of glucose in liquids

Tablets of the following composition were prepared by pressing:

| | G. |
|---|---|
| o-Vanillin-(vanilloyl)-hydrazone | 0.002 |
| Peroxidase | 0.001 |
| Glucose oxidase | 0.002 |
| Sec. sodium phosphate | 0.0069 |
| Primary sodium phosphate | 0.013 |

A tablet as set out above was dissolved in 5 ml. aqueous alcohol (1:1), mixed with 0.2 ml. of the glucose solution to be analyzed, the solution made up to 10 ml. with alcohol and measured colorimetrically at a wavelength of 520 nm. Using a calibration curve, the glucose content was determined from the measured extinction.

EXAMPLE 5

Determination of glucose with other indicators 1 mmol of each of the indicators set out in the following table was dissolved or suspended in 1 ml. methanol and then mixed with 1 ml. of a solution obtained by dissolving 143 mg. glucose oxidase and 7.5 mg. peroxidase in 100 ml. phosphate or citrate buffer having a pH of 5.6, as well as with 1 ml. of a glucose solution. There were obtained the color reactions indicated in the following table. In this table, the symbols given in the column headings correspond to those in the above Formula I with the exception of Z which corresponds to the radical:

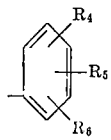

TABLE

| Compound | R₁ | n | X | R₂ | R₃ | Z | Color of reaction product |
|---|---|---|---|---|---|---|---|
| 1 | 2-hydroxy-3-methoxyphenyl (4-OH, 3-OCH₃ phenyl) | 1 | O | H | H | 4-hydroxy-3-methoxyphenyl | Brown. |
| 2 | Same as above | 1 | O | H | H | 3-methoxy-4,6-dihydroxyphenyl (—OCH₃, —OH) | Violet. |
| 3 | do | 1 | O | H | H | 4-hydroxy-3-ethoxyphenyl (—OH, —OC₂H₅) | Brown. |
| 4 | do | 1 | O | H | H | 3,4-dihydroxyphenyl (—OH, —OH) | Yellowish brown. |
| 5 | do | 1 | O | H | H | 2,4-dihydroxyphenyl (—OH, —OH) | Red-violet. |
| 6 | 3-methoxy-2-hydroxyphenyl attached via —CH= to 1-phenyl-3-methyl-5-pyrazolone | 1 | O | H | H | 3-methoxy-4-hydroxyphenyl (—OCH₃, —OH) | Red-brown. |
| 7 | 2-hydroxy-3-methoxyphenyl | 1 | O | H | H | 3,4-dihydroxyphenyl (—OH, —OH) | Red-violet. |
| 8 | Same as above | 1 | O | H | H | 4-methoxyphenyl (—OCH₃) | Grey. |
| 9 | do | 1 | O | H | H | 3-methyl-4-hydroxyphenyl (—CH₃, —OH) | Brown-violet. |
| 10 | do | 1 | O | H | H | 3-methyl-4-hydroxyphenyl (—CH₃, —OH) | Do. |

TABLE—Continued

| Compound | R₁ | n | X | R₂ | R₃ | Z | Color of reaction product |
|---|---|---|---|---|---|---|---|
| 11 | ...do... | 1 | O | H | H | phenyl with NH₂ and —OCH₃ | Blue-violet. |
| 12 | ...do... | 1 | O | H | H | phenyl with —NH₂ and —OH | Brown. |
| 13 | phenyl with —OCH₃ and —OH | 1 | O | H | H | phenyl with —OCH₃ and —OH | Violet. |
| 14 | 1-phenyl-3-methyl-5-pyrazolone | 1 | O | H | H | phenyl with —OCH₃ and —OH | Red-brown. |
| 15 | benzyl (—CH₂—phenyl) | 1 | O | H | H | Same as above | Blue-violet. |
| 16 | p-nitrophenyl (—NO₂) | 1 | O | H | H | ...do... | Pink. |
| 17 | phenyl with —OH | 1 | O | H | H | phenyl with OH and —OCH₃ | Do. |
| 18 | Same as above | 1 | O | H | H | phenyl with —OCH₃ and —OH | Do. |
| 19 | phenyl | 1 | O | H | H | Same as above | Do. |
| 20 | 2-hydroxynaphthyl (—OH) | 1 | O | H | H | ...do... | Pale violet. |
| 21 | NH₂— | 1 | O | H | H | ...do... | Red-violet. |
| 22 | phenyl with —OCH₃, —OH, and —CH=N—NH—CO— | 1 | O | H | H | ...do... | Orange. |

TABLE—Continued
| Compound | R₁ | n | X | R₂ | R₃ | Z | Color of reaction product |
|---|---|---|---|---|---|---|---|
| 23 |  | 1 | O | H | H | ...do... | Yellowish-red. |
| 24 | 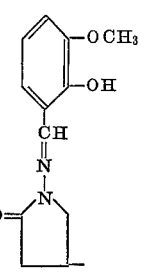 | 1 | O | H | H | ...do... | Raspberry. |
| 25 | CH₃— | 1 | O | H | H | ...do... | Blue-violet. |
| 26 | 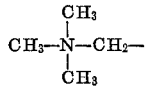 | 1 | O | H | H | ...do... | Violet. |
| 27 | NH₂— | 1 | S | H | H | ...do... | Blue-violet. |
| 28 | NH₂— | 1 | O | H | CH₃ | 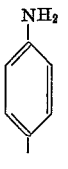 | Brown. |
| 29 | NH₂— | 1 | NH | H | H | 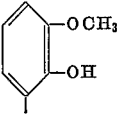 | Dark carmine. |
| 30 | 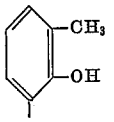 | 1 | O | H | H | Same as above | Pink. |
| 31 |  | 1 | O | H | H | ...do... | Blue. |
| 32 | NH₂— | 0 | O | — | H | ...do... | Wine red. |
| 33 | 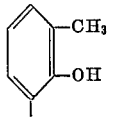 | 1 | O | H | H | ...do... | Pink. |
| 34 | 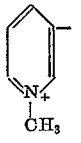 | 1 | O | H | H | ...do... | Orange. |
| 35 | H₂—N—CH₂— | 1 | O | H | H | ...do... | Pink. |
| 36 | 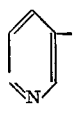 | 1 | O | H | H | ...do... | Purple. |
| 37 | 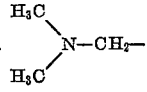 | 1 | O | H | H | ...do... | Dark red |

TABLE—Continued
| Compound: | $R_1$ | n | X | $R_2$ | $R_3$ | Z | Color of reaction product |
|---|---|---|---|---|---|---|---|
| 38 |  | 1 | O | H | H | ...do... | Blue. |
| 39 | $H_3-C-CH_2-$ | 1 | O | H | H | ...do... | Grey-brown. |
| 40 | 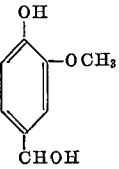 | 1 | O | H | H | ...do... | Red-violet. |
| 41 | 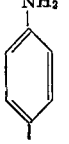 | 1 | O | H | H | ...do... | Violet. |
| 42 | 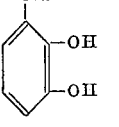 | 1 | O | H | H | 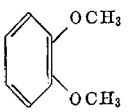 | Grey-brown. |
| 43 | 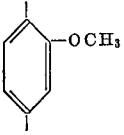 | 1 | O | H | H | 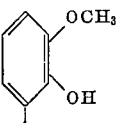 | Violet. |
| 44 | 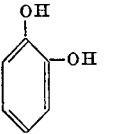 | 1 | O | H | H | Same as above... | Do. |
| 45 | 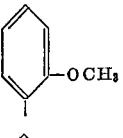 | 1 | O | H | H | ...do... | Red. |
| 46 | 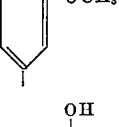 | 1 | O | H | H | ...do... | Red-violet. |
| 47 | 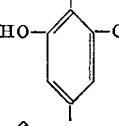 | 1 | O | H | H | ...do... | Brown. |
| 48 | 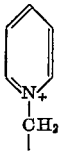 | 1 | O | H | H | ...do... | Wine red. |
| 49 | $H_5C_2-O-CO-$ | 1 | O | H | H | ...do... | Orange. |
| 50 | $H_2N-CO-$ | 1 | O | H | H | ...do... | Purple. |

3,558,435

TABLE—Continued

| $R_1$ | n | X | $R_2$ | $R_3$ | Z | Color of reaction product |
|---|---|---|---|---|---|---|

Compound:

51 — [R_1 = -NH-N=CH-(phenyl with -OH and -OCH_3), with (CHOH)_2-CO- chain] — 1 — O — H — H — ....do........... — Red.

| $R_1-\underset{X}{\overset{}{C}}-(N)_n-\underset{}{\overset{}{R_2}}$ | n | $R_3$ | Z | Color of reaction product |
|---|---|---|---|---|

Compound No.:

52 — [morpholine-2,3-dione-like: O, N, C=O ring] — — H — [phenyl with -OCH_3, -OH] — Violet.

53 — [hydantoin: HN-C(=O)-CH_2-N(CH_3)-C(=O)] — 1 — H — Same as above..... — Lilac.

54 — [pyridazine with CH_3 and NH substituents] — 1 — H — ....do........... — Blue.

55 — [pyrimidine with NH, HO, CH_3] — 1 — H — ....do........... — Do.

56 — [pyridine with NH] — 1 — H — ....do........... — Violet.

57 — [pyridazine with HN and Cl] — 1 — H — ....do........... — Bright blue.

58 — [pyridazine with NH] — 1 — H — ....do........... — Do.

59 — [triazolopyridazine with NH and CH_3] — 1 — H — ....do........... — Do.

EXAMPLE 6

Determination of blood in urine

Filter paper (Schleicher & Schüll 2316) was impregnated with a solution of 0.316 g. o-vanillin-(vanilloyl)-hydrazone in 100 ml. methanol.

500 ml. acacia plant mucilage, which had been prepared by boiling 200 g. acacia in 500 ml. water was admixed with 25 ml. cumol hydroperoxide and the mixture then vigorously stirred for 5 minutes in a mixer.

163 g. sodium citrate and 37 g. citric acid were dissolved in 1.5 liters water. 3.5 g. gelatine were dissolved in the citrate buffer thus obtained and the first mentioned hydrazone solution added thereto.

The combined solutions were then mixed with 5 ml. of a 1% aqueous emulsion of a peroxide-containing starch (preferably the product commercially available in the U.S.A. under the name "dialdehyde starch") and, after thorough mixing, further mixed with 50 ml. sodium lauryl sulfate and further stirred for 5 minutes. The emulsion which was thereby obtained was placed for 5 minutes in a homogenizer working at a pressure of 100 kg./cm.². To the homogenized mixture there was added 250 ml. of a citrate buffer prepared in the same manner as described above.

The filter paper impregnated with the indicator was then immersed into the emulsion obtained and then dried for 16 hours at 50° C. in an air circulation drying cabinet. The test papers thus obtained took on a violet color reaction when dipped into urine containing blood.

We claim:

1. Diagnostic agent for use in the analytical determination of (a) hydroperoxide or a substance which reacts with the liberation of hydrogen peroxide, of (b) peroxidase or a peroxidatively active substance, which diagnostic agent comprises, in case (a), a chromogen and a member selected from the group consisting of peroxidase and peroxidatively active substances; and, in case (b), a chromogen and a member selected from the group consisting of hydroperoxide or a substance which reacts with the liberation of hydroperoxide; said chromogen being a compound of the formula:

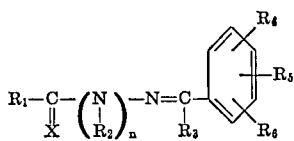

wherein $R_1$ is a member selected from the group of radicals consisting of amino, aliphatic, araliphatic, aromatic and heterocyclic radicals and radicals having the formula:

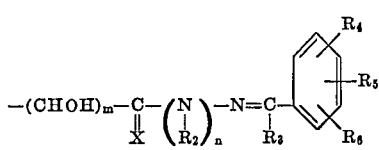

wherein $R_2$ is a member selected from the group consisting of hydrogen, aliphatic, aromatic and heterocyclic radicals $R_3$ is a member selected from the group consisting of hydrogen, alkyl and phenyl, $R_4$ is a member selected from the group consisting of amino, hydroxy and alkoxy, $R_5$ and $R_6$ are each a member selected from the group consisting of hydrogen, amino, hydroxy, alkoxy and alkyl, X is a member selected from the group consisting of oxygen, sulfur, imino, and $R_1$ substituted imino, $n$ is 0 or 1, and $m$ is 0, 1 or 2; and whereupon X and $R_1$, $R_1$ and $R_2$, $R_1$ and $R_3$ can be joined together to form a ring.

2. Diagnostic agent according to claim 1 for use in the determination of hydroperoxide or a substance which reacts with the liberation of hydrogen peroxide comprising a member selected from the group consisting of peroxidase and peroxidatively active substances; and a chromogen as defined in claim 1.

3. Diagnostic agent according to claim 1 for use in the determination of peroxidase and peroxidatively active substances comprising a member selected from the group consisting of hydrogen peroxide and substances forming hydrogen peroxide; and a chromogen as defined in claim 1.

4. Diagnostic agent according to claim 1 in the form of a test paper impregnated with said diagnostic agent.

5. Diagnostic agent according to claim 1 in the form of a solution thereof.

6. Diagnostic agent according to claim 1 in the form of a tablet.

7. Diagnostic agent according to claim 1 for use in the determination of peroxide in liquids comprising a test paper containing peroxidase, a buffer, and o-vanillin-(o-vanilloyl)-hydrazone.

8. Diagnostic agent according to claim 1 for use in the determination of glucose in urine comprising a test paper containing peroxidase, glucose oxidase in citrate buffer, and 2,3-dihydroxybenzal-(vanilloyl)-hydrazone.

9. Diagnostic agent according to claim 1 for use in the determination of glucose in blood comprising a test paper containing peroxidase, glucose oxidase in citrate buffer, and o-vanillin-(o-vanilloyl)-hydrazone.

10. Diagnostic agent according to claim 1 for use in the determination of glucose in liquids comprising a tablet containing: o-vanillin-(o-vanilloyl)-hydrazone, peroxidase, glucose oxidase, sec. sodium phosphate and primary sodium phosphate.

11. Diagnostic agent according to claim 1 for use in the determination of glucose in blood comprising a test paper containing peroxidase, glucose oxidase in citrate buffer, and 2-hydroxy-3-methoxy-benzal-urea.

12. Diagnostic agent according to claim 1 for use in the determination of glucose in blood comprising a test paper containing peroxidase, glucose oxidase in citrate buffer, and o-vanillin-semicarbazone.

13. Diagnostic agent according to claim 1 for use in the determination of glucose in blood comprising a test paper containing peroxidase, glucose oxidase in citrate buffer, and (1-(2-hydroxy-3-methoxy-benzal) - 2-($\beta$-N-pyridiniumacetyl)-hydrazine)-chloride.

14. Process for the analytical determination of (a) hydroperoxide or a substance which reacts with the liberation of hydrogen peroxide, or (b) peroxidase or a peroxidatively active substance which process comprises contacting a liquid containing the substance of interest with a reagent comprising a diagnostic agent according to claim 1 producing a color with respect to said liquid as visual evidence of the presence of said substance of interest in said liquid.

15. Diagnostic agent as claimed in claim 1 wherein the chromogen is o-vanillin-p-vanilloyl-hydrazone.

16. Diagnostic agent as claimed in claim 1 wherein the chromogen is o-vanillin-o-vanilloyl-hydrazone.

17. Diagnostic agent as claimed in claim 1 wherein the chromogen is o-vanillin-semicarbazide.

18. Diagnostic agent as claimed in claim 1 wherein the chromogen is o-vanillin-pyrodoyl-hydrazone.

19. Diagnostic agent as claimed in claim 1 wherein the chromogen is o-vanillylidene-urea.

20. Diagnostic agent as claimed in claim 1 wherein the chromogen is 3-[o-vanillylideneamino]-hydantoin.

21. Diagnostic agent as claimed in claim 1 wherein the chromogen is o-vanillin (trimethyl ammonium acetyl)-hydrazone.

References Cited
UNITED STATES PATENTS
3,233,974  2/1966  Bradley _____ 195—103.5X
3,350,278  10/1967  Gretton et al. ____ 195—103.5X

OTHER REFERENCES
Chem. Abstracts 48:9947h 1953.

ALVIN E. TANENHOLTZ, Primary Examiner
M. D. HENSLEY, Assistant Examiner

U.S. Cl. X.R.

23—230; 252—408; 260—239.3, 250, 256.4, 294.8, 295, 295.5, 296, 307, 309.5, 455, 471, 551, 552, 553, 558, 561 562, 566, 240

UNITED STATES PATENT OFFICE
CERTIFICATE OF CORRECTION

Patent No. 3,558,435　　　　　　　　Dated　Jan. 26, 1971

Inventor(s)　Hans-Georg Rey et al.

It is certified that error appears in the above-identified patent and that said Letters Patent are hereby corrected as shown below:

Column 2, line 1, "peroixde" should read -- peroxide --; line "hydorgen" should read -- hydrogen --. Column 3, line 25, "unicase" should read -- uricase --; line 52, "componets" sh read -- components --. Column 14, Table Compound 52; under column "n" insert -- 1 --. Column 15, line 35, "of", second occurrence, should read -- or --. Column 16, line 8, "whereu should read -- wherein --.

Signed and sealed this 20th day of July 1971.

(SEAL)
Attest:

EDWARD M. FLETCHER, JR.　　　　　　WILLIAM E. SCHUYLER, JR
Attesting Officer　　　　　　　　　Commissioner of Patents